United States Patent [19]
Menoud

[11] Patent Number: 5,637,859
[45] Date of Patent: Jun. 10, 1997

[54] METHOD AND APPARATUS FOR EXCHANGING INFORMATION WITH SUBSCRIBER CARDS USED IN ARTICLE VENDING MACHINES

[75] Inventor: Edouard Menoud, Plan-les-Ouates, Switzerland

[73] Assignee: Inventio AG, Hergswil NW, Switzerland

[21] Appl. No.: 543,305

[22] Filed: Oct. 16, 1995

Related U.S. Application Data

[62] Division of Ser. No. 296,228, Aug. 25, 1994, Pat. No. 5,489,014.

[30] Foreign Application Priority Data

Aug. 3, 1994 [CH] Switzerland ............ 02430/94

[51] Int. Cl.$^6$ .................................. G06K 19/06
[52] U.S. Cl. ............................ 235/492; 235/380
[58] Field of Search .................... 235/381, 380, 235/441; 902/4, 26, 28, 38

[56] References Cited

U.S. PATENT DOCUMENTS

| | | |
|---|---|---|
| 2,432,215 | 12/1947 | Hatcher et al. . |
| 2,819,817 | 1/1958 | MacKenzie et al. . |
| 3,917,114 | 11/1975 | Grosse . |
| 3,948,376 | 4/1976 | Roman . |
| 4,288,783 | 9/1981 | Chauvat et al. . |
| 4,369,442 | 1/1983 | Werth et al. . |
| 4,562,490 | 12/1985 | Barth et al. ............ 235/493 |
| 4,598,378 | 7/1986 | Giacomo . |
| 4,598,810 | 7/1986 | Shore et al. . |
| 4,654,513 | 3/1987 | Hennessy . |
| 4,696,385 | 9/1987 | Davies . |
| 4,767,917 | 8/1988 | Ushikubo . |
| 4,780,602 | 10/1988 | Kawana ................ 235/380 |
| 4,801,787 | 1/1989 | Suzuki ................. 235/380 |
| 4,829,169 | 5/1989 | Watanabe .............. 235/492 |
| 4,845,484 | 7/1989 | Ellsberg . |
| 4,877,945 | 10/1989 | Fujisaki ................ 235/441 |
| 4,880,097 | 11/1989 | Speas . |
| 4,889,221 | 12/1989 | Sclumpf . |
| 4,907,250 | 3/1990 | Ricks . |
| 4,908,502 | 3/1990 | Jackson ................ 235/437 |
| 4,908,769 | 3/1990 | Vaughan et al. . |
| 4,930,129 | 5/1990 | Takahira ............... 371/40.4 |
| 4,967,895 | 11/1990 | Speas . |

(List continued on next page.)

FOREIGN PATENT DOCUMENTS

| | | |
|---|---|---|
| 0018718 | 11/1980 | European Pat. Off. . |
| 0387972 | 9/1990 | European Pat. Off. . |
| 2359469 | 2/1978 | France . |
| 3113946 | 10/1982 | Germany . |
| 3207148 | 9/1983 | Germany . |
| 3802186 | 5/1989 | Germany . |
| 4017092 | 1/1992 | Japan ................... 235/381 |
| 2211337 | 6/1981 | United Kingdom . |
| 2240649 | 8/1991 | United Kingdom . |
| 2260011 | 3/1993 | United Kingdom ....... 235/381 |

*Primary Examiner*—Donald T. Hajec
*Assistant Examiner*—Mark Tremblay
*Attorney, Agent, or Firm*—Howard & Howard Atty.

[57] ABSTRACT

A coin checker and card reader for use with a vending machine includes a housing having a coin slot and a separate card slot which merge into a chute that communicates with a first coin channel and a card channel. A coin inserted into the coin slot rolls through the chute into the first coin channel and passes sensors which determine whether the coin is accepted or rejected. A door is actuated to direct an accepted coin into a coin container through a second coin channel. A rejected coin is directed to a return tray through a third coin channel. A subscriber card with a memory inserted into the card slot is guided into the card channel to actuate a switch to activate a microprocessor for exchanging information with the subscriber card memory and processing a transaction. The microprocessor checks the data being exchanged to prevent loss of data should the card be removed before the transaction is completed and to vend an article only after valid data has been exchanged.

12 Claims, 9 Drawing Sheets

U.S. PATENT DOCUMENTS

| | | | |
|---|---|---|---|
| 5,010,237 | 4/1991 | Kawana | 235/441 |
| 5,097,115 | 3/1992 | Ogasawara et al. | 235/381 |
| 5,136,284 | 8/1992 | Kitamura. | |
| 5,147,021 | 9/1992 | Maruyama et al.. | |
| 5,196,687 | 3/1993 | Sugino et al. | 235/441 |
| 5,293,030 | 3/1994 | Dietrich et al.. | |
| 5,479,637 | 12/1995 | Lisimaque et al. | 235/492 |
| 5,521,363 | 5/1996 | Tannenbanh | 235/379 |

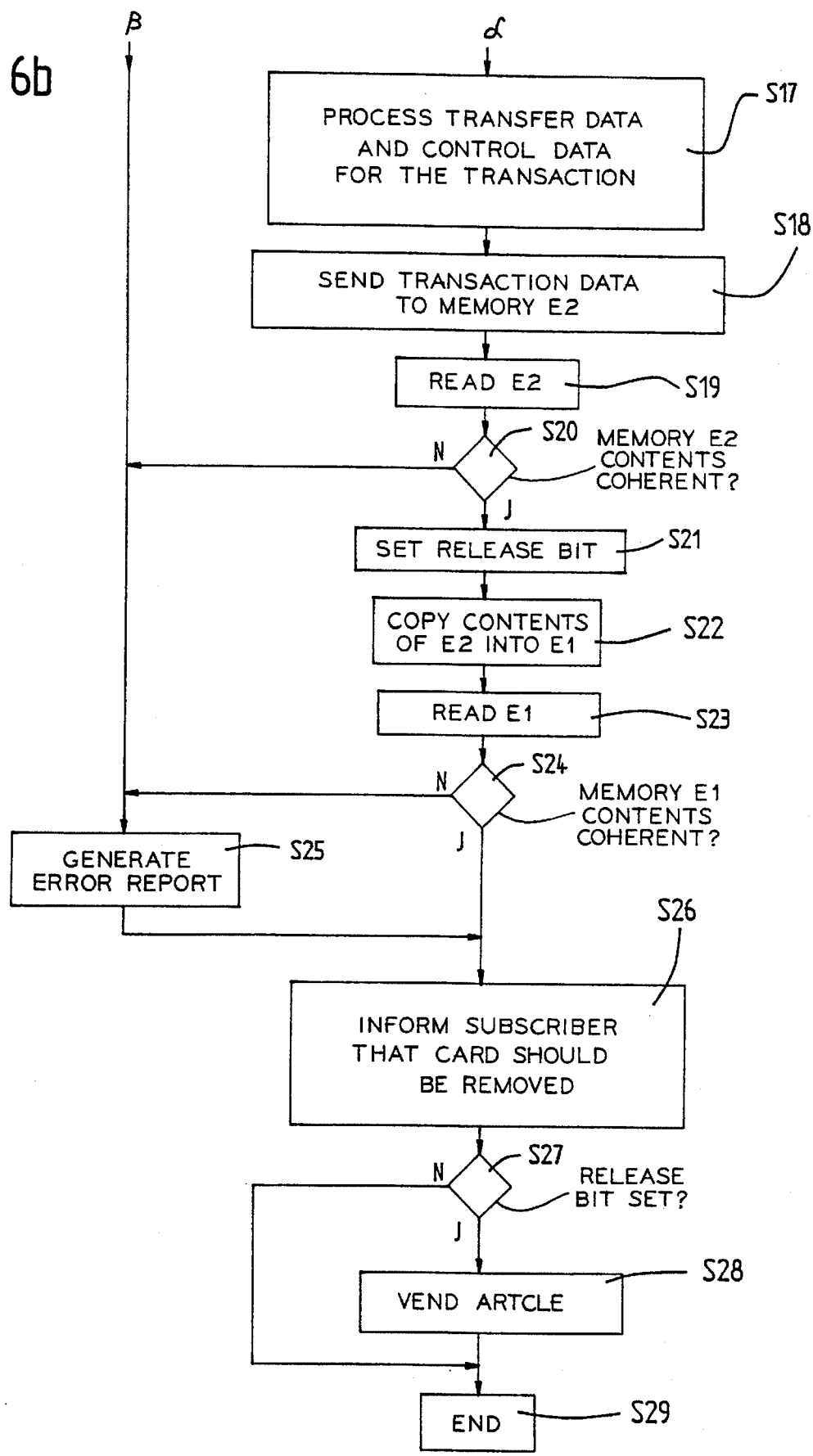

METHOD AND APPARATUS FOR EXCHANGING INFORMATION WITH SUBSCRIBER CARDS USED IN ARTICLE VENDING MACHINES

This is a divisional application(s) Ser. No. 08/296,228 filed on Aug. 25, 1994 now U.S. Pat. No. 5,489,014.

BACKGROUND OF THE INVENTION

The present invention relates generally to an apparatus for verifying the means of payment for an article to be vended and, in particular, to an apparatus for automatically checking coins and reading cards inserted into a vending machine.

The U.S. Pat. No. 4,880,097 shows an electronic parking meter which accepts coins or parking cards in payment for parking time. The coins and the parking cards are placed into the same slot which merges into a collective chute in which two switches are mounted. A first one of the switches is operated by coins and the other one of the switches is operated by parking cards. As soon as the first switch is operated by a coin, a microprocessor is switched from a waiting state into an operating state and instantaneously a coin discriminator or checker is actuated. The microprocessor is also switched from the waiting state to the operating state by the operation of the second switch by a parking card and reads data from the parking card in order for the microprocessor to recognize a valid parking card.

A disadvantage of the above described equipment is that the user of the parking meter can not recognize that a coin or a parking card has become stuck in the chute until he or she attempts to use the meter. Furthermore, the single slot prevents the use of one means of payment once the other means of payment has become stuck.

SUMMARY OF THE INVENTION

The present invention concerns an apparatus for checking coins and reading subscriber cards used by customers in payment for articles to be rended from a vending machine. The apparatus includes a housing having spaced apart top and bottom walls attached to a pair of spaced apart side walls with a coin slot for inserting coins and a card slot for inserting subscriber cards formed in one of the side walls. A chute formed inside the housing has an upper end in communication with both the coin slot and the card slot and has an open lower end. A first coin channel is formed inside the housing and has an open upper end in communication with the open lower end of the chute and an open lower end. A card channel is formed inside the housing and is in communication with the chute for receiving a potion of the subscriber card inserted into the card slot.

The apparatus also includes a first switch mounted in the housing adjacent to the first coin channel for generating a first signal upon sensing a coin received from the chute and a second switch mounted in the housing in the card channel for generating a second signal upon sensing a subscriber card inserted into the card channel through the card slot. A control circuit has inputs connected to the first and second switches and is responsive to the first and second signals for generating a signal enabling the vending machine to vend the article. An advantage of the apparatus is that when an object inserted into the coin slot becomes stuck in the chute, the card slot is not blocked for receiving the subscriber cards or the coins and when an object inserted into the card slot becomes stuck in the chute, the coin slot is not blocked for receiving the coins.

The apparatus includes a second coin channel formed inside the housing having an open upper end in communication with the open lower end of the first coin channel and an open lower end in communication with an opening in the bottom wall of the housing, a third coin channel formed inside the housing having an open upper end in communication with the open lower end of the first coin channel and an open lower end in communication with another opening in the bottom wall of the housing and a door rotatably mounted in the housing adjacent the open lower end of the first coin channel for selectively directing an accepted coin into the second channel and a rejected coin into the third channel.

A card reader having a plurality of contact fingers is mounted in the housing adjacent the card channel for engaging a conductive surface on the subscriber card for information exchange between the control circuit and a memory on the card. The control circuit is responsive to a termination of the second signal representing a premature withdrawal of the subscriber card from the card slot prior to generating the signal enabling the vending machine to vend the article for generating an error report and preventing the vending machine from vending the article. Also the control protects the information in the memory should the transaction not be authorized such as when the mount available for a purchase is less than the purchase price of the article.

The present invention also concerns a method of exchanging information with a memory on a subscriber card used by a customer to pay for articles to be vended from a vending machine. The method comprises the steps of: reading information stored in a memory on a subscriber card, the memory having first and second storage sectors; generating transaction data representing a purchase of an article from a vending machine utilizing the information read from the memory; storing the transaction data in the second storage sector; checking whether the transaction data stored in the second storage sector is coherent; copying the coherent transaction data from the second storage sector into the first storage sector; checking whether the transaction data stored in the first storage sector is coherent; and generating a release signal for vending the article from the vending machine when the transaction data stored in the first storage sector is coherent.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIGS. 6a and 6b are flow diagrams a first program for controlling data transfer in the control shown in the FIG. 5.

DESCRIPTION OF THE PREFERRED EMBODIMENT

Figure 1:
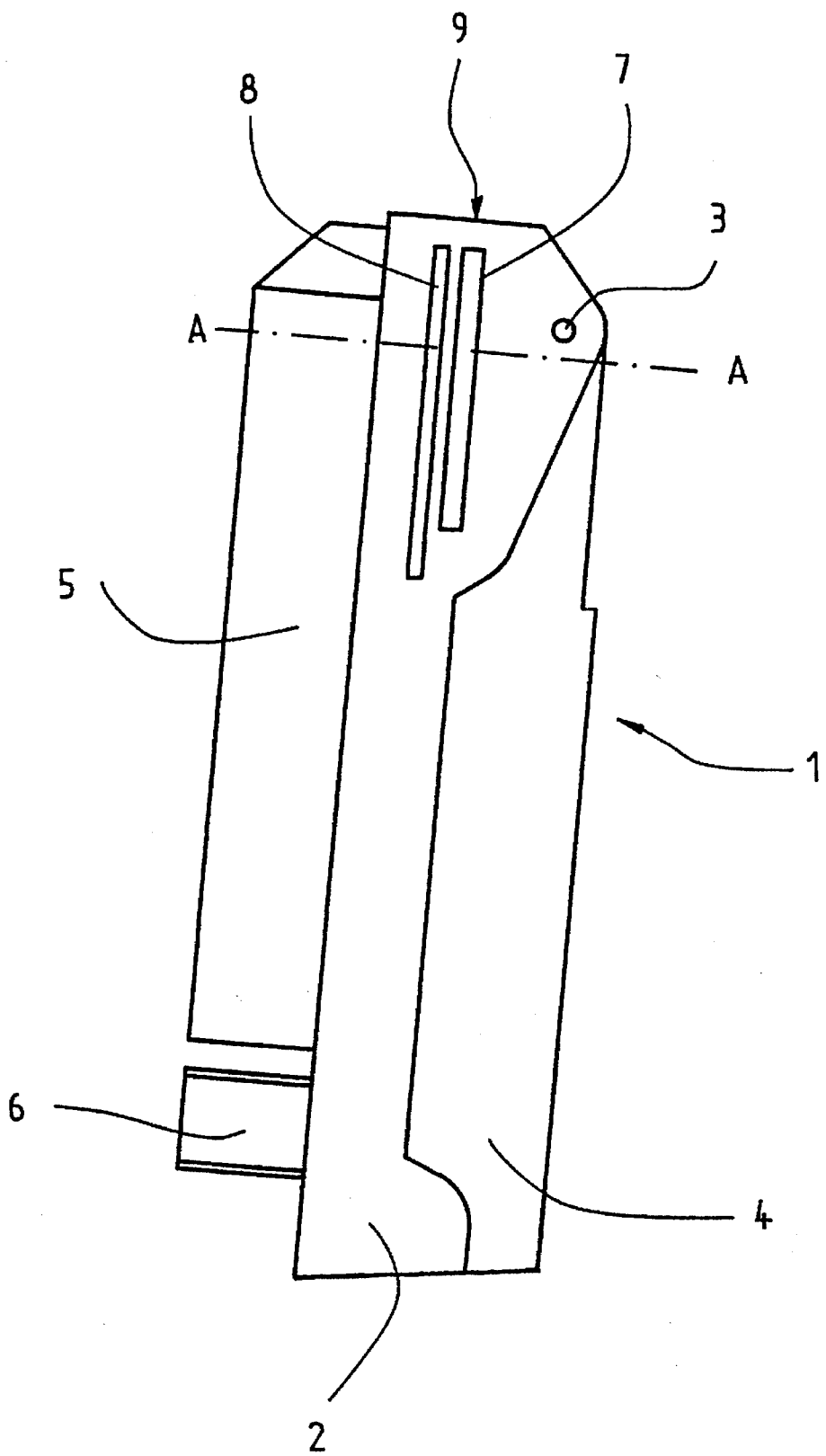
FIG. 1 is a left side elevation view of a coin checker in accordance with the present invention.

There is shown in the FIGS. 1 through 5 a coin checker 1 in accordance with the present invention in an orientation associated with a normal mounting position in or on a vending machine (not shown). The coin checker 1 includes a generally rectangular housing 2 having a top wall spaced from and attached to a bottom wall by a pair of side walls. The housing 2 is open at a front side and a rear side, and partially open at the bottom wall. In an upper portion of each of the side walls of the housing 2 is located a pivot point 3 at which is rotatably mounted a front cover 4 closing the open front side of the housing. The rear side of the housing 2 is closed by a back cover 5 attached to the housing and a first actuator 6, such as an electromagnet, is mounted on the housing 2 below the back cover. A first coin slot 7 and a card slot 8 are formed in the left side wall of the housing 2 and a second coin slot 9 is formed in the top wall of the housing. Some customers may find the side slot 7 more convenient to use while other customers may find the top slot 9 more convenient to use.

Figure 2:
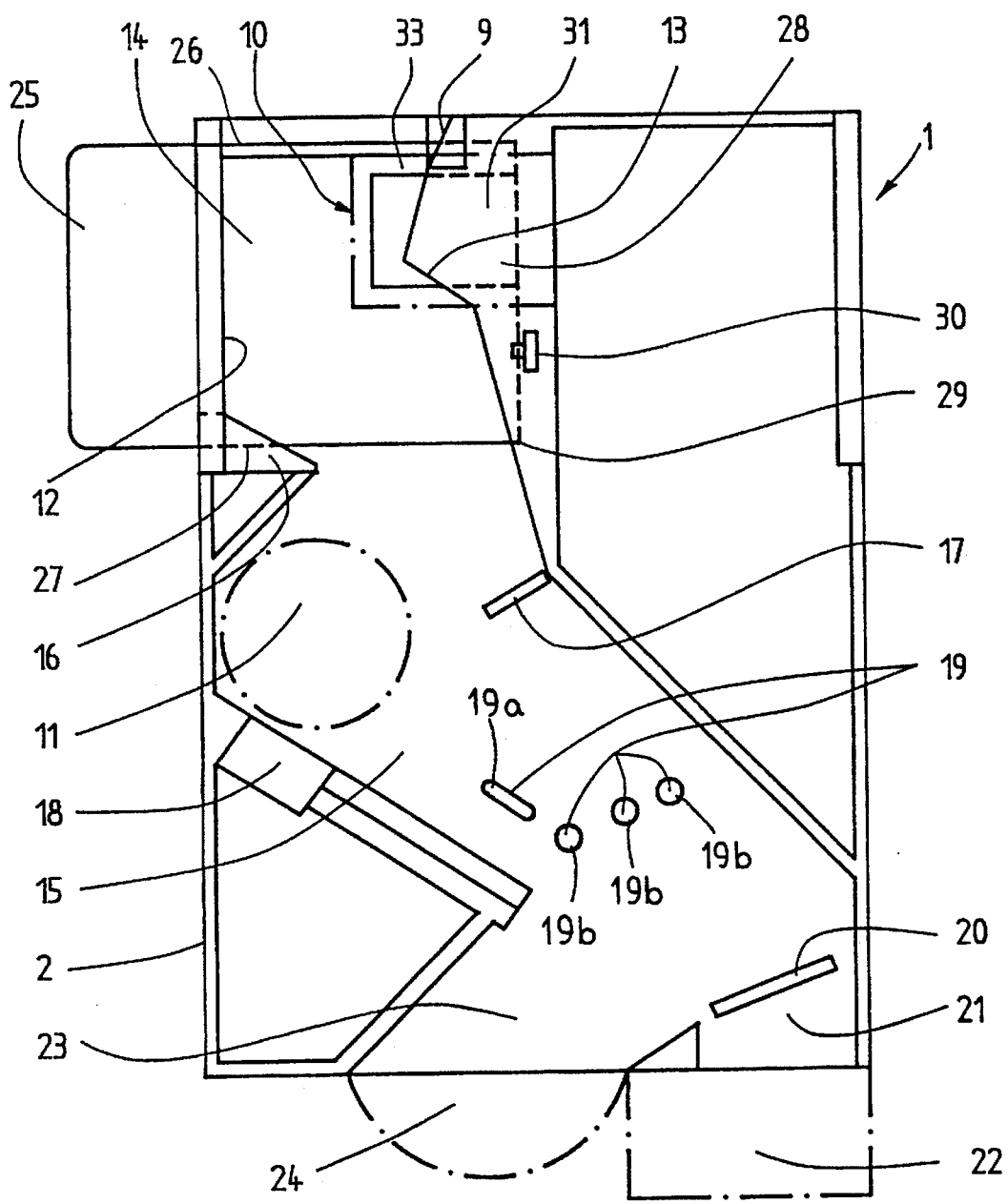
FIG. 2 is a front elevation view of the coin checker shown in the FIG. 1 with the front cover removed.
Figure 3:
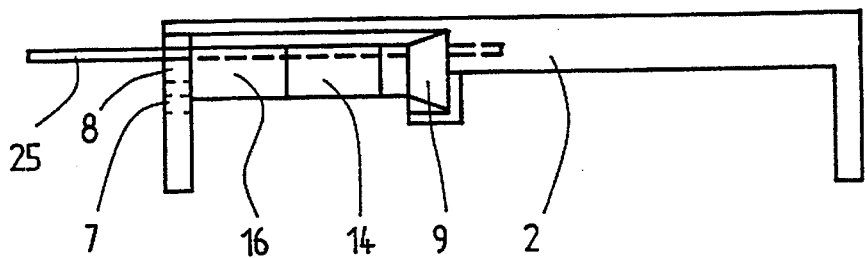
FIG. 3 is a top plan view of the coin checker shown in the FIG. 2.
Figure 4:
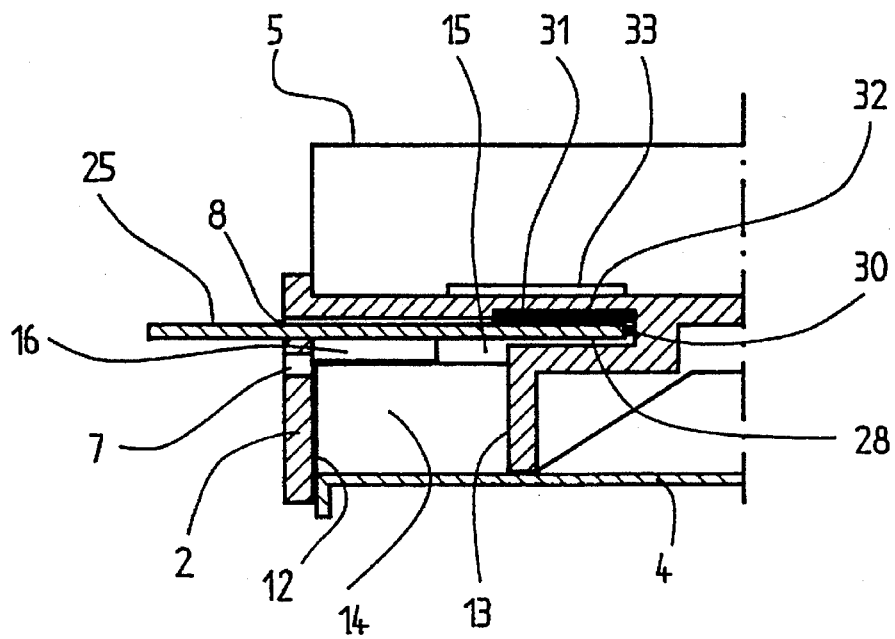
FIG. 4 is a cross-sectional view of the coin checker taken along the line A–A in the FIG. 1.

In the FIG. 2, the coin checker 1 is shown with the front cover 4 removed to reveal a card reader 10 mounted in the housing 2 adjacent the card slot 8. The first coin slot 7 and the second coin slot 9 each communicate with an interior of the housing 2 and each will accept a coin 11 which rolls or falls between a first chute wall 12 and a second facing chute wall 13 in the housing. The chute walls 12 and 13 extend generally vertically and transverse to the longitudinal axes of the slots 7 and 9 to define a chute 14 therebetween extending from one end at the top wall of the housing 2 to an opposite lower open end that communicates with an open upper end of a first coin channel 15 formed in the interior of the housing. In the mounting position of the housing 2 shown in the FIG. 1, the coin 11 will roll along an upwardly facing surface of a carrier 16 attached to and extending from the left side wall of the housing 2 into the chute 14. The upper surface of the carder 16 is sloped downwardly to direct the coin 11 toward the second chute wall 13 and against an upper surface of a first diverter wall 17. The first diverter wall 17 is attached to and extends from the second chute wall 13 downwardly toward the first chute wall 12 below the carrier 16. The first diverter wall 17 directs the coin 11 underneath the carder 16 and against an upper surface of a second diverter wall 18 attached to and extending downwardly from the left side wall of the housing 2. The second diverter wall 18 is sloped downwardly to direct the coin 11 past a plurality of conventional sensors 19 mounted inside the housing 2 adjacent to the first coin channel 15 for checking the characteristics of the coin.

If the sensed characteristics indicate that the coin 11 is accepted, the first electromagnet 6 is actuated to pivot a door 20 out of the path of travel of the coin 11. The door 20 is rotatably mounted in the housing 2 at an open bottom end of the first coin channel 15 such that the accepted coin 11 falls into an open upper end of a second coin channel 21 which communicates with the open lower end of the first coin channel. An open lower end of the second coin channel 21 communicates with an opening formed in the bottom wall of the housing at which a coin collection container 22 is mounted for receiving the accepted coin. If the coin 11 is not accepted, or the container 22 is full, the door 20 will not be moved from the illustrated position. The coin 11 will fail against the door 20 which is sloped downwardly toward an open upper end of a third coin channel 23 which also communicates with the lower end of the first coin channel 15. An open lower end of the third coin channel 23 communicates with another opening formed in the bottom wall of the housing 2 at which a coin return tray 24 is mounted for receiving the rejected coin where the rejected coin can be recovered by the customer. Both the container 22 and the tray 24 are shown in phantom as they typically are components of the associated vending machine.

A card 25, such as a subscription card having a data storage memory, can be inserted into the card slot 8 by a subscriber. The card 25 has an upper edge which is engaged by a generally horizontally extending first guide 26 formed an inner surface of the top wall of the housing 2 and a lower edge which is engaged by a generally horizontally extending second guide 27 formed in the carrier 16. As the card 25 is pushed through the upper portion of the chute 14, the forward edge will enter a card channel 28 formed in the second chute wall 13 to abut a generally vertically extending third guide 29 formed in second chute wall. Positioned in the third guide 29 is a switch 30 which is actuated by the forward edge of the card 25. When the card 25 is in the fully inserted position shown in the FIGS. 2–5, a board 31, mounted in the card reader 10 and having a plurality of contact fingers 32 thereon, is adjacent a conductive surface of the card which is electrically connected to the card memory. The contact fingers 32 make electrical contact with the conductive surface of the card 25 and are connected to a control circuit 33 mounted in the card reader 10.

Figure 5:
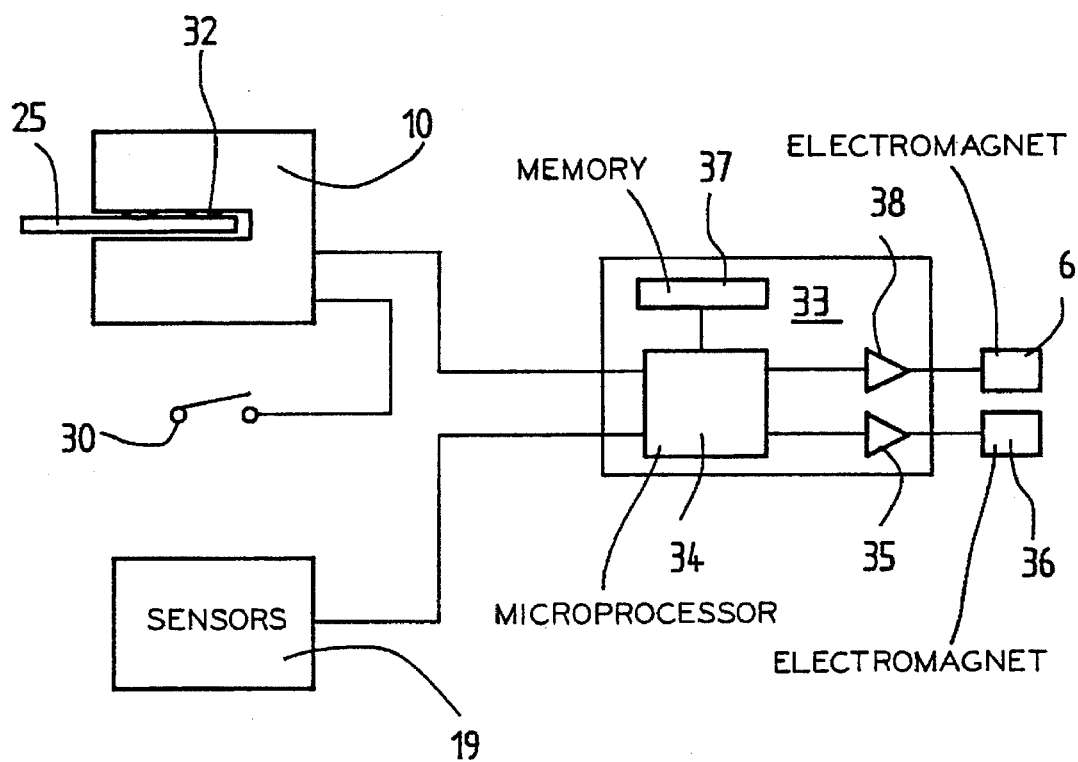
FIG. 5 is a schematic diagram of the control circuit of the coin checker shown in the FIG. 1.

There is shown in the FIG. 5 a schematic block diagram of the control circuit 33 of the coin checker 1 which is mounted on the card reader 10. The switch 30 and the contact fingers 32 are connected to separate inputs to the control circuit 33. An input of a data processing means 34 such as a microprocessor is connected to receive the signals generated from the switch 30 and the contacts 32. Each of the sensors 19 is connected to another input of the microprocessor 34. The microprocessor 34 has an output connected to an input of an amplifier 35 having an output connected to an input of a second actuator 36, such as an electromagnet. A memory 37 is connected to an input/output of the microprocessor 34. The microprocessor 34 has another output connected to an input of an amplifier 38 having an output connected to an input of the electromagnet 6. The microprocessor 34, the amplifier 35, the memory 37 and the amplifier 38 can be mounted on the card reader 10 or can be components of an associated vending machine. The memory 37 can store an operating program for the microprocessor 34, data for checking the inserted coins and the cards and transaction data generated by the microprocessor.

As soon as the inserted card 25 closes the switch 30, a signal is generated to switch the microprocessor 34 from a waiting state to an operating state. The microprocessor 34 reads data stored in the memory of the card of 25 through the contact fingers. If valid data has been read, the microprocessor generates an output signal through the amplifier 35 to actuate the electromagnet 36 which opens a compartment (not shown) of the associated vending machine containing an article to be vended.

If coins are used as a means of payment, the first coin 11 sensed by the sensor 19a generates a signal from the card reader 10 to switch the microprocessor 34 from a waiting state to an operating state. The microprocessor 34 compares the signals representing the characteristics of the coins as generated by the sensors 19b with data stored in the memory 37 representing standard coin characteristics. When a valid coin has been sensed, the microprocessor generates an output signal to the amplifier 38 to actuate the electromagnet 6 and rotate the door 20 thereby directing the coin into the container 22. Simultaneously, the microprocessor generates the signal through the amplifier 35 to actuate the electromagnet 36 and open the article containing compartment.

Not shown is a mechanism typically mounted on the front cover 4 for returning coins or cards of the customers. This mechanism can include an electromagnet which can also be connected to an output of the microprocessor 34. Stuck coins as well as foreign objects inserted into the chute 14 fall into the first coin channel 15 at the actuation of this mechanism. This mechanism can simultaneously clear the chute 14, the card channel 28 and the first coin channel 15.

The known cards used to activate devices such as telephones are suitable only for storing small quantifies of data. Such cards use an EEPROM for storage having sufficient capacity to store only the required information. Data protection during the data transfer between the card memory and the device is not provided nor is it guaranteed. However, where relatively large amounts of data are being transferred, data protection is necessary in the event of an interruption before the transfer is completed.

In the coin checker I according to the present invention, the microprocessor 34 implements a program to prevent data losses with respect to the data stored on the card 25 where, for example, the subscriber removes his or her card from the card slot 8 before the data transfer has been completed and the article has been vended.

The microprocessor 34 can run a first program ALGO1 which directs the data transfers with cards having data storage means, for example cards with EEPROM memories. Such a memory is organized so that the transfer data is accompanied by control data to permit a check of the data being transferred. The transfer data can represent, for example, the amount available to purchase articles, the expiration date of the card, the type of article to be vended, number of articles to be vended in one day, days on which articles are to be vended, etc. The transfer dam and the control data are stored in the EEPROM memory twice, namely in a first storage sector E1 and in a separate second storage sector E2. In the following example, the first storage sector E1 serves as a final storage means for the overall information relating to a transaction and the second storage sector E2 serves as a temporary storage means. However, each of the storage sectors E1 and E2 can function as the temporary storage means or as the final storage means as becomes necessary. The contents of the first storage sector E1 normally is identical with the contents of the second storage sector E2.

Before a transaction, for example the purchase of a magazine or a beverage from a vending machine having the coin checker 1 installed thereon, the data in the first storage sector E1 and in the second storage sector E2 are read under the control of the microprocessor 34. Thus, in the event that the contents read from the first sector E1, when subsequently checked, are incoherent, those contents are replaced with the contents of the other sector E2 and checked again. In the event that the contents read from the second sector E2, are incoherent, the contents are replaced with the contents of the other sector E1 and checked again. The transaction and the transfer of transaction related data to the card 25 are not permitted until the contents of both of the sectors E1 and E2 are coherent. When transfer is allowed, the transaction data is stored in the second sector E2 and checked. Coherent data is copied from the second sector E2 into the first sector E1 and the transaction is completed by releasing the corresponding article to the customer. A premature withdrawal of the card 25 causes incoherent data in one or the other of the sectors E1 and E2 as a consequence, but never incoherent data in both sectors. Thus, the presence o C coherent data in at least one of the sectors is guaranteed before the card is withdrawn.

Figure 6A:
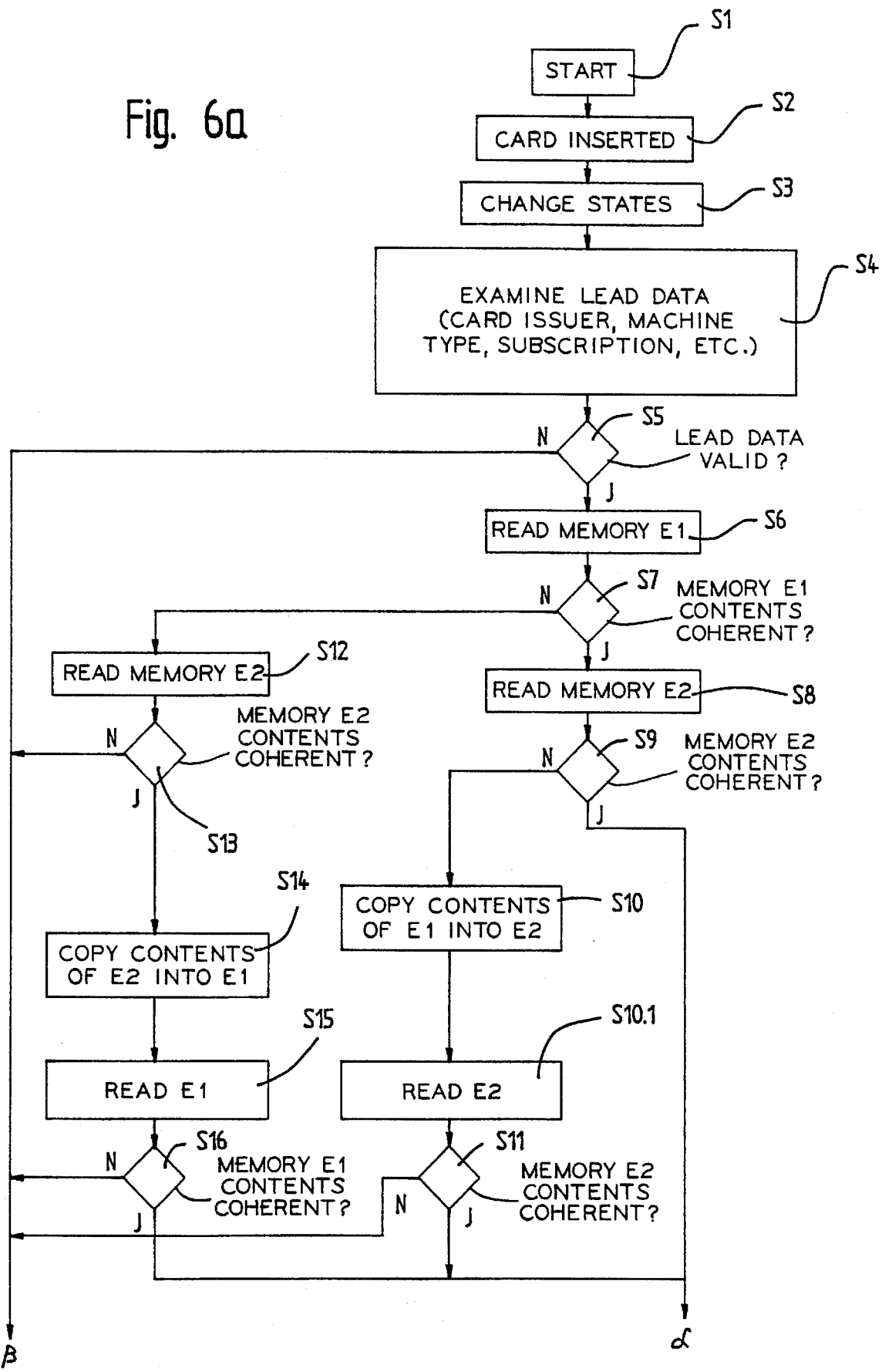

There is shown in the FIGS. 6a and 6b the first program ALGO1, in the form of a flow diagram, which can be stored in the memory 37. Instructions S1 through S4 provide the initialization of the transaction process, and the examination and the identification of the lead data necessary to valid the transaction as being authorized. The lead data can represent, for example, the issuer of the card, the type of vending machine, a specific machine location, the identity of the subscriber, etc. The program begins at the instruction S1 START. The instruction S2 recognizes that the card 25 has been inserted into the coin checker 1. In the instruction S3, the microprocessor 34 is switched from the waiting state to the operating state. In the instruction S4, the lead data stored on the card is examined. Invalid lead data causes a branch at "N" from a decision point S5 along a path β to the FIG. 6b.

If the lead data is valid, the program continues from the decision point S5 at "J" through instructions wherein the contents of the storage sectors E1 and E2 are examined. In an instruction S6, the contents of the sector E1 are read and in a decision point S7, the contents of the sector E1 are checked to determine whether they are coherent data. If the contents are coherent, the program branches at "J" from the decision point S7 and enters an instruction S8 wherein the contents of the sector E2 are read. At a decision point S9, the contents of the sector E2 are checked to determine whether they are coherent. If the contents are coherent, the program branches at "J" from the decision point S9 along a path α to the FIG. 6b. If the contents of the sector E2 are not coherent, the program branches at "N" from the decision point S9 to an instruction S10 wherein the contents of the sector E1 are copied into the sector E2. The program enters an instruction S10.1 wherein the contents of the sector E2 are read. At a decision point S11, the contents of the sector E2 are checked to determine whether they are coherent. If the contents are coherent, the program branches at "J" from the decision point S11 along the path α to the FIG. 6b. Incoherent contents cause a branch at "N" from the decision point S11 along the path β to the FIG. 6b.

If the contents of the sector E1 are not coherent at the decision point S7, the program branches at "N" and enters an instruction S12 wherein the contents of the sector E2 are read. At a decision point S13, the contents of the sector E2 are checked to determine whether they are coherent. If the contents are coherent, the program branches at "J" from the decision point S13 to an instruction S14 wherein the contents of the sector E2 are copied into the sector El. The program enters an instruction S15 wherein the contents of the sector E1 are read. At a decision point S16, the contents of the sector E1 are checked to determine whether they are coherent. If the contents are coherent, the program branches at "J" from the decision point S16 along the path α to the FIG. 6b. Incoherent contents cause a branch at "N" from the decision point S16 along the path β to the FIG. 6b. Thus, the path α represents parity or agreement between the coherent contents of the sectors E1 and E2 and the path β represents incoherent data read from the card 25.

In the FIG. 6b, the path α leads to an instruction S17 wherein the data representing the transaction, the control data and the transfer data, is generated by the microprocessor 34. In an instruction S18, the transaction data is sent to the storage sector E2 on the card 25. An instruction S19 causes the contents of the sector E2, now the transaction data, to be read. In a decision point S20, these contents are checked to determine whether they are coherent. Incoherent data causes a branch at "N" from the decision point 20 to the path β. Coherent data causes a branch at "J" from the decision point 20 to an instruction S21 wherein a release bit is set. In an instruction S22, the transaction data in the sector E2 is copied into the sector E1. An instruction S23 reads the transaction data from the sector E1. At a decision point S24, the data from the sector E1 is checked to determine whether it is coherent. Incoherent data causes a branch at "N" from the decision point 24 to the path β. The path β leads to an instruction S25 wherein the subscriber is informed of an error in the attempted transaction. Coherent data causes a branch at "J" from the decision point 24.

Both the instruction S25 and the "J" branch from the decision point 24 lead to an instruction S26 wherein the subscriber is informed that the card 25 can be removed from the coin checker 1. In a decision point S27, the status of the release bit is checked. If the release bit is set, a branch is made at "J" to an instruction S29 which causes an article to be vended to the subscriber. If the release bit is not set, a branch is made at "N" from the decision point S27. Both the "N" branch and the instruction S28 lead to an instruction S29 which causes the first program AGLO1 to end. If the transaction has been completed, the transaction data now is stored in both of the sectors E1 and E2 on the card 25. The stored transaction data then can be used by the program ALGO1 to prevent the card from being used to complete an unauthorized transaction.

In summary, the first program ALGO1 will permit a transaction only when coherent data can be read from the card memory and coherent transaction data can be stored in the card memory. Otherwise, the transaction process is terminated and no article is vended.

A second program ALGO2, shown as a flow diagram in the FIGS. 7a through 7d, also can be run by the microprocessor 34 to control a transaction with a card that stores an account balance which is changed as a result of a purchase of an article and/or reloading. The EEPROM memory on the card 25 has loaded into the final memory data representing a predetermined starting account balance which data is changed to reflect a current account balance or status as the card is used. The account balance can represent a monetary amount available for purchasing articles or each of several monetary amounts available for purchasing articles of different prices, an issuance date, a purchase date, an expiration date, etc. The storage capacity of the memory on the card 25 is not sufficient for a double storage of the transaction data during data transfer as done in the first program ALGO1 described above. Thus, the memory on the card 25 is divided into an account storage sector or account memory for the account balance and a data storage sector or data memory for the remaining data which make up the final storage means. A transfer storage sector or transfer memory functions as the temporary storage means which is smaller in capacity than the final storage means. The second program ALGO2 operates to control the data transfer with the card 25 in a manner similar to the program ALGO1, but because of the shortage of memory space, the data is moved in steps rather than all at one time through the transfer storage sector. The transaction data other than the account balance data is loaded into the transfer memory. Then the contents of the transfer memory are copied into the data memory and the transfer memory is erased. This causes another data transfer step wherein the new account balance is loaded into the transfer memory and then copied into the account memory. The article is not vended until after the new account balance has been stored on the card 25.

There is shown in the FIGS. 7a, 7b, 7c and 7d a flow diagram of the second program ALGO2 which can be stored in the memory 37. A first four instructions S30 through S33 are similar to the instructions S1 through S4 shown in the FIG. 6a. These instructions direct the initialization of the transaction process in the coin checker 1, and the examination and the identification of the lead data storm on the card 25 as, for example, the issuer of the card, the type of vending machine, the subscriber identity, etc. The instruction S33 leads to a decision point S34 wherein a check is made as to whether a data bit is set. If the data bit is set, the program branches at "J" along a path α to the FIG. 7b. If the data bit is not set, the program branches at "N" to a decision point S35 wherein a transfer bit is checked. If the transfer bit is set, the program branches at "J" along a path β to the FIG. 7b. If the transfer bit is not set, the program branches at "N" to an instruction S36 wherein transfer data is loaded into the transfer memory. The instruction S36 leads to a decision point S37 wherein the transfer data is checked for validity. If the transfer data is valid, the program branches at "J" to an instruction S39 wherein the transfer bit is set. The program then follows the path β. If the transfer data is not valid, the program branches at "N" along a path μ through the FIGS. 7b and 7c to the FIG. 7d.

Figure 7A:
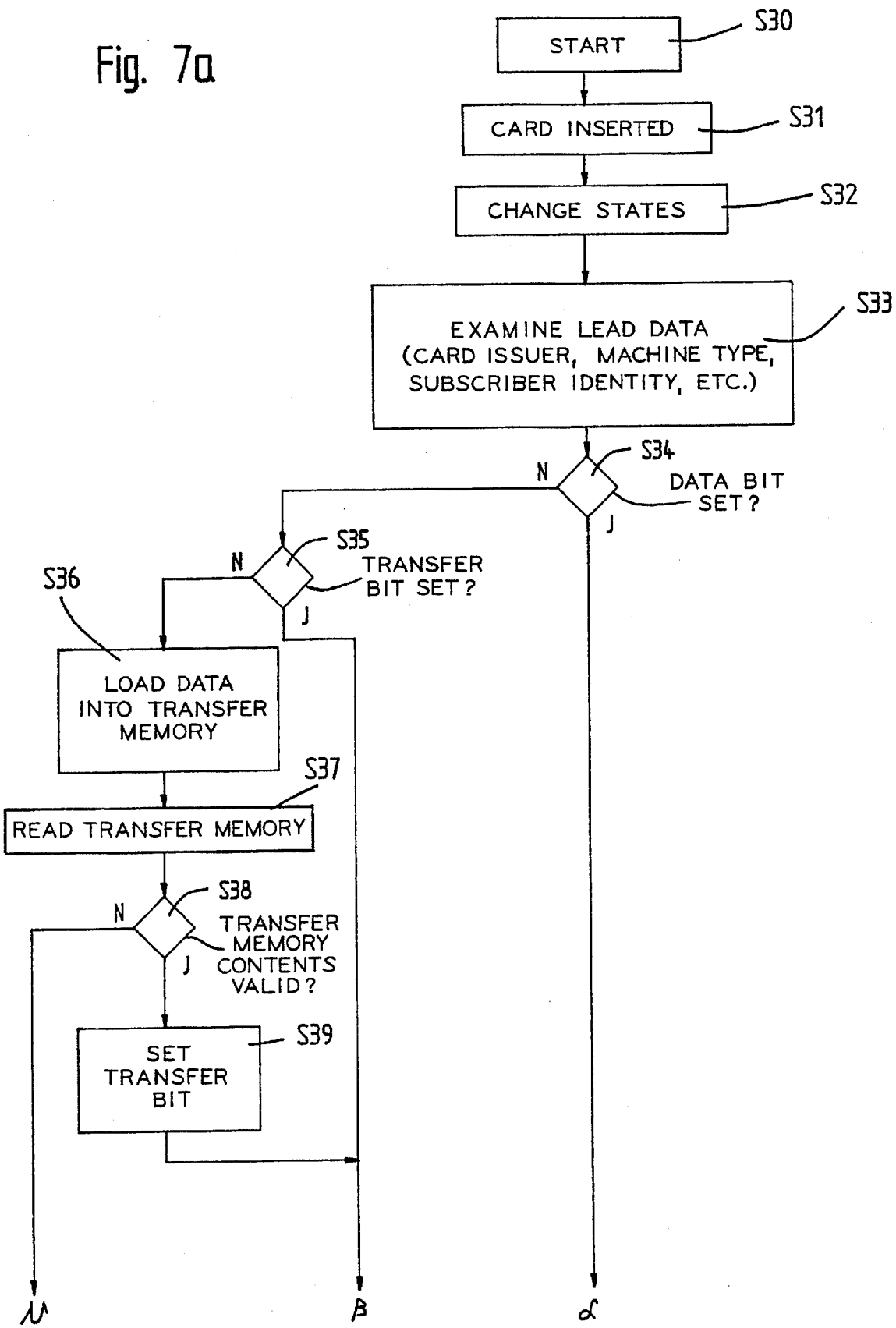
FIGS. 7a, 7b, 7c and 7d are flow diagrams of a second program for controlling data transfer in the control shown in the FIG. 5.
Figure 7B:
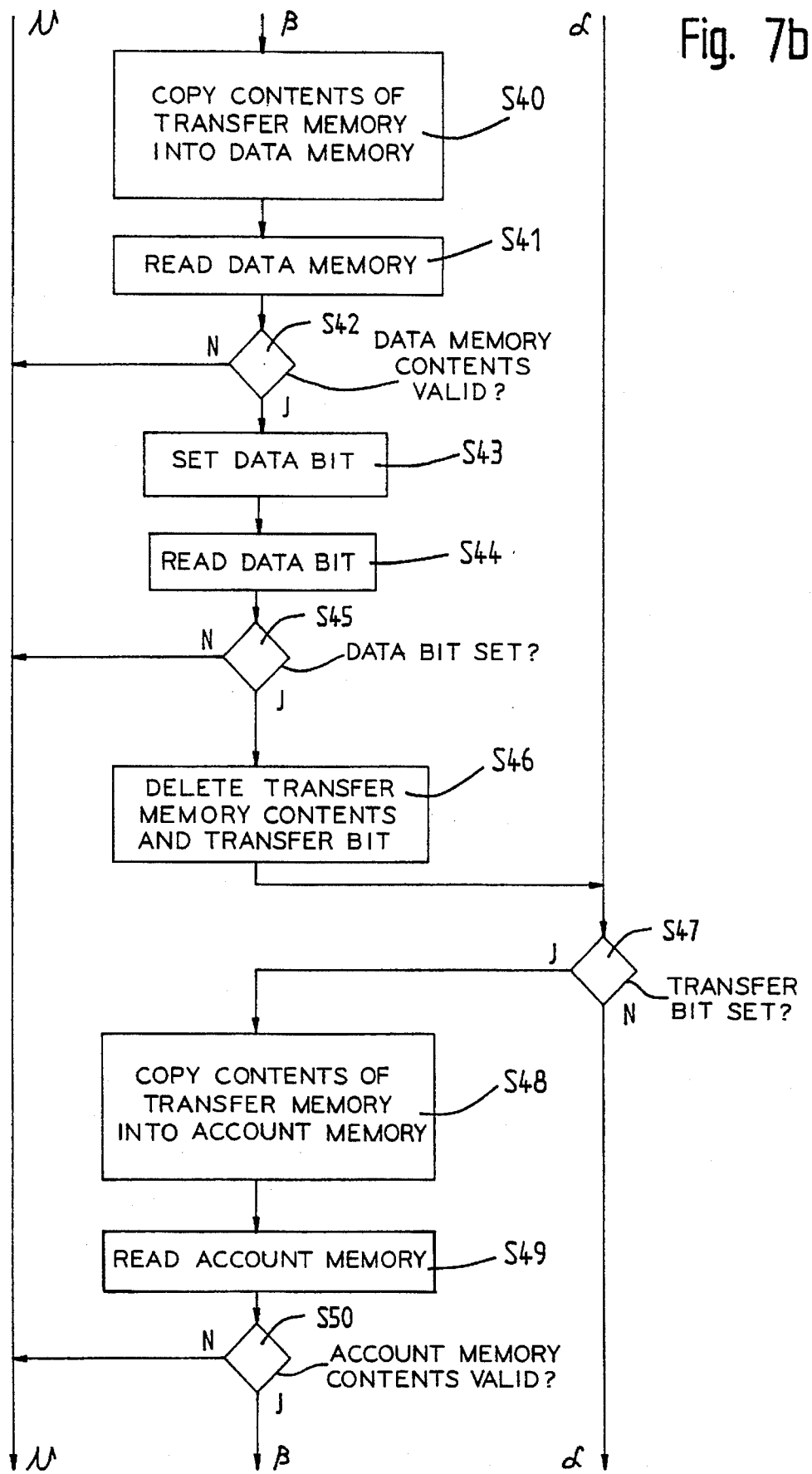

In the FIG. 7b, the path 18 enters an instruction S40 wherein the contents of the transfer memory are copied into the data memory. In an instruction S41, the data memory contents are read. In a decision point S42, the contents of the data memory are checked for validity. If the data is not valid, the program branches at "N" to the path μ. If the data is valid, the program branches at "J" from the decision point S42 to an instruction S43 wherein the data bit is set. In an instruction S44, the data bit is read. In a decision point S45, a check is made as to whether the data is set. If the data bit is not set, the program branches at "N" to the path μ. If the data bit is set, the program branches at "J" from the decision point S45 to an instruction S46 wherein the transfer bit is deleted. The program then joins the path α at a decision point S47 where a check of the transfer bit is made. If the transfer bit is not set, the program branches at "N" to continue the path μ to the FIG. 7c. If the transfer bit is set, the program branches at "J" from the decision point S47 to an instruction S48 wherein the contents of the transfer memory are copied into the account memory. In an instruction S49, the contents of the account memory are read. In a decision point S50, the contents of the account memory are checked for validity. If the data is valid, the program branches at "J" to continue the path β. If the data is not valid, the program branches at "N" from the decision point S50 to the path μ.

Figure 7C:
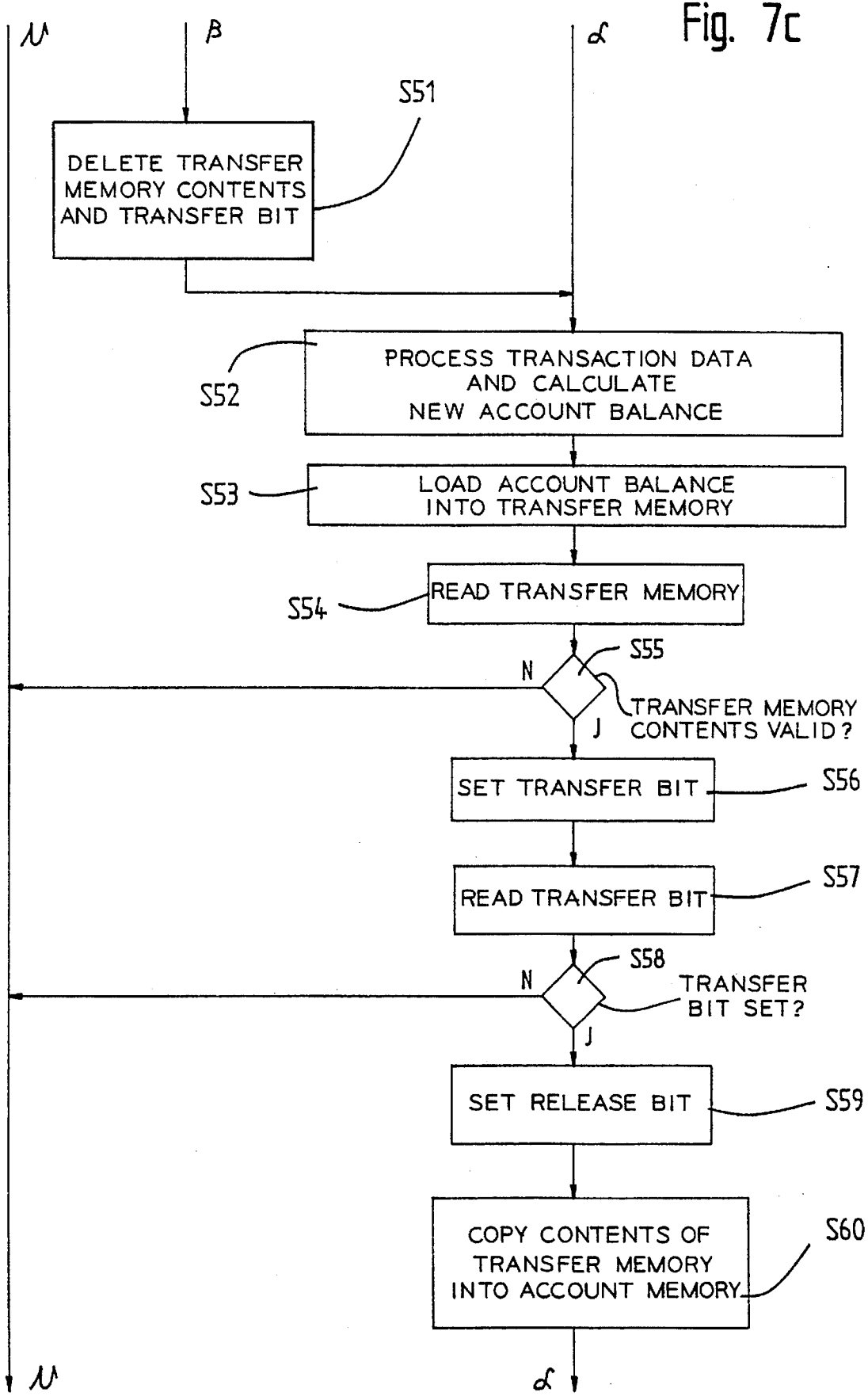

In the FIG. 7c, the path β leads to an instruction S51 wherein the transfer memory contents and the transfer memory bit are deleted or erased. The program then joins the path β with the path α at an instruction S52 wherein new account status data is calculated. In an instruction S53, the account status data is loaded into the transfer memory. The program then enters an instruction S54 wherein the data in the transfer memory is read. In a decision point S55, the dam is checked for validity. If the data is not valid, the program branches at "N" to the path μ. If the data is valid, the program branches at "J" from the decision point S55 to an instruction S56 wherein the transfer bit is set. The program then enters an instruction S57 wherein the transfer bit is read. In a decision point S58, a check is made for a set transfer bit. If the transfer bit is not set, the program branches at "N" to the path μ. If the transfer bit is set, the program branches at "J" from the decision point S58 to an instruction S59 wherein a release bit is set. The program then enters an instruction S60 wherein the data in the transfer memory is copied into the account memory and the program continues on the path α.

Figure 7D:
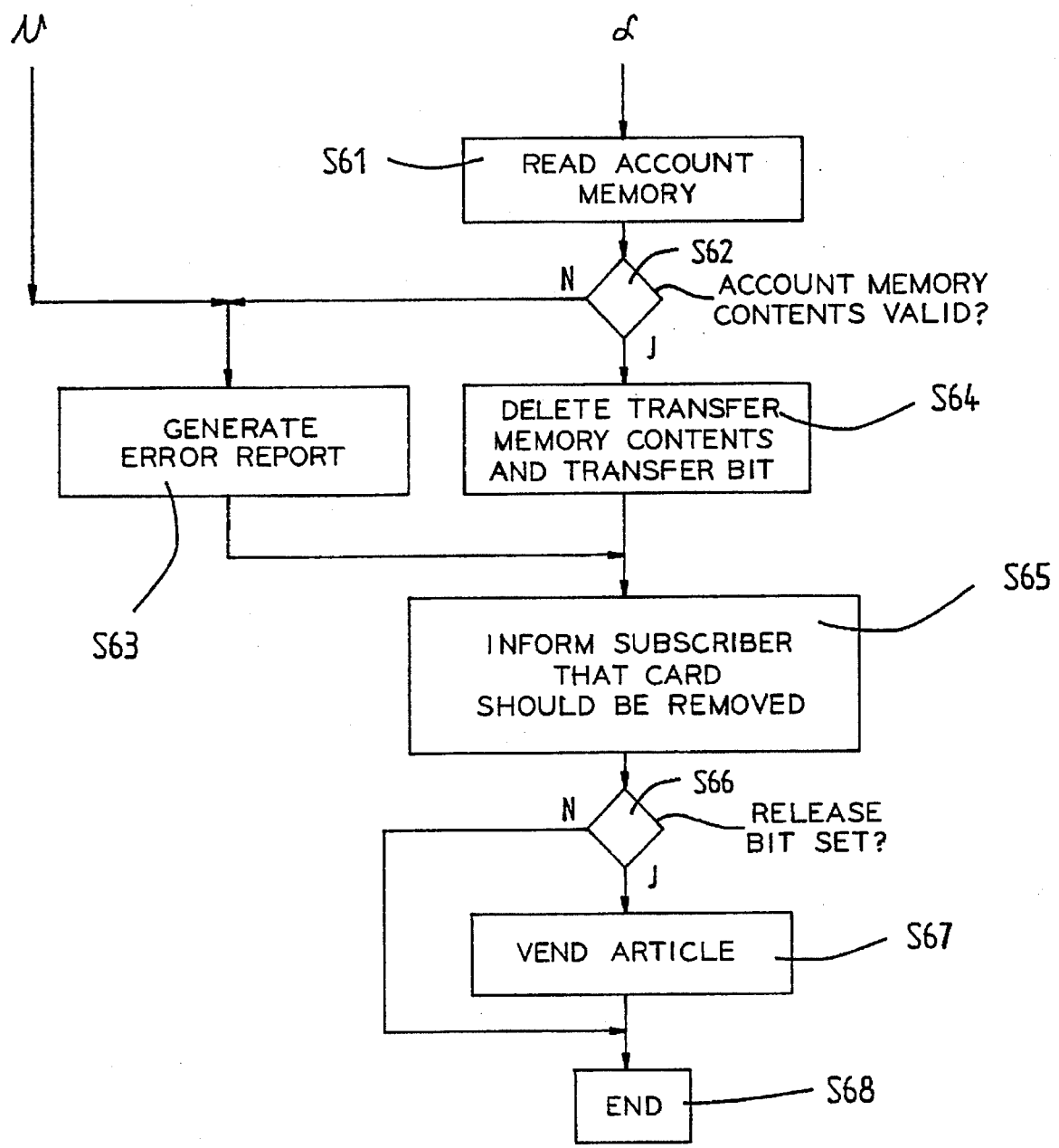

In the FIG. 7d, the program continues on the path α to an instruction S61 wherein the account memory is read. In a decision point S62, the data in the account memory is checked for validity. If the data is not valid, the program branches at "N" to join the path μ an enter an instruction S63 wherein an error report is made to the service person. If the data is valid, the program branches at "J" from the decision point S62 to an instruction S64 wherein the transfer bit is deleted. The instructions S63 and S64 lead to an instruction S65 wherein the subscriber is instructed to remove the card 25. In a decision point S66, a check is made as to whether the release bit is set. If the release bit is set, the program branches at "J" to an instruction S67 wherein an article is vended. If the release bit is not set, a branch is made at "N" from the decision point S66. Both the "N" branch and the instruction S67 lead to an instruction S68 which causes the second program AGLO2 to end.

In summary, the second program ALGO2 will permit a transaction only when coherent data can be read from the card memory and valid transaction data can be stored in the card memory. Otherwise, the transaction process is terminated and no article is vended.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of exchanging information with a memory on a subscriber card used by a customer to pay for articles to be vended from a vending machine comprising the steps of:
   a. reading information stored in a memory on a subscriber card, the memory having first and second storage sectors;
   b. generating transaction data representing a purchase of an article from a vending machine utilizing the information read from the memory;
   c. storing the transaction data in the second storage sector;
   d. checking whether the transaction dam stored in the second storage sector is coherent;
   e. copying the coherent transaction data from the second storage sector into the first storage sector;
   f. checking whether the transaction data stored in the first storage sector is coherent; and
   g. generating a release signal for vending the article from the vending machine when the transaction data stored in the first storage sector is coherent.

2. The method according to claim 1 wherein the first storage sector is a final memory, and the second storage sector is a temporary memory and said step e. is performed by replacing all transaction data stored in the first storage sector with the transaction data stored in the second storage sector.

3. The method according to claim 1 wherein when said transaction data is incoherent in said step d., bypassing said steps e. through g. and generating an error report, and when said transaction data is incoherent in said step f., bypassing said step g. and generating an error report.

4. The method according to claim 1 wherein the information is stored in the first storage sector and also is stored in the second storage sector and said step a. is performed by reading the information in the first storage sector, checking to determine whether the information read from the first storage sector is coherent, reading the information in the second storage sector, checking to determine whether the information read from the second storage sector is coherent, copying the coherent information from the second storage sector into the first storage sector when the information in the first storage sector is incoherent, copying the coherent information from the first storage sector into the second storage sector when the information in the second storage sector is incoherent, bypassing said steps b. through g. and generating an error report when the information in both the first and second storage sectors is incoherent and bypassing said steps b. through g. and generating an error report when the information in one of the first and second storage sectors remains incoherent after said copying.

5. The method according to claim 1 wherein the first storage sector includes an account memory, the second storage sector is a transfer memory and the transaction data includes account balance data, said step c. includes storing the account balance data in the transfer memory, said step d. includes checking the account balance data in the transfer memory, said step e. includes copying the stored account balance data from the transfer memory into the account memory, said step f. includes checking the account balance data in the account memory and said step g. includes generating the release signal if the account balance data in the account memory is coherent.

6. The method according to claim 5 wherein when said account balance data is incoherent in said step d., bypassing said steps e. through g. and generating an error report, and when said account balance data is incoherent in said step f., bypassing said step g. and generating an error report.

7. The method according to claim 5 wherein the first storage sector includes a data memory, the information includes account balance data stored in the data memory and other data stored in the data memory and said step a. is performed by loading the other data from the data memory into the transfer memory, checking whether the other data in the transfer memory is coherent, copying the coherent other data from the transfer memory into the data memory, checking whether the other data in the data memory is coherent, deleting the other data from the transfer memory when the other data in the data memory is coherent, generating an error report when the other data in the transfer memory is incoherent and generating an error report when the other data in the data memory is incoherent after said copying.

8. An apparatus for exchanging information with subscriber cards offered by purchasers in payment for articles to be vended from a vending machine comprising:

a housing having spaced apart top and bottom walls attached to a pair of spaced apart side walls with a card slot for inserting a subscriber card formed therein and a card channel formed inside said housing and being in communication with said card slot for receiving a portion of the subscriber card inserted into said card slot;

a switch mounted in said housing in said card channel for generating a signal upon sensing the subscriber card inserted into said card channel through said card slot;

a card reader including a plurality of contact fingers mounted in said housing adjacent said card channel, said contact fingers engaging a conductive surface on the subscriber card;

a control circuit having inputs connected to said switch and to said contact fingers and being responsive to said signal generated by said switch for exchanging information with a memory on the subscriber card and for enabling the vending machine to vend the article, the memory having first and second storage sectors for storing data; and a microprocessor in said control circuit for reading the information stored in the memory on the subscriber card and for generating transaction data representing a purchase of an article from a vending machine utilizing the information read from the memory, said microprocessor storing said transaction data in said second storage sector, checking said stored transaction data for coherence, copying said stored transaction data into said first storage sector when coherent, checking said transaction data stored in said first storage sector for coherence and generating a release signal for vending the article from the vending machine when said transaction data stored in said first and second storage sectors is coherent.

9. The apparatus according to claim 8 wherein said first storage sector is a final memory, said second storage sector is a temporary memory and said microprocessor replaces any data stored in said first storage sector with said transaction data from said second storage sector.

10. The apparatus according to claim 8 wherein said microprocessor reads said information stored in said first storage sector, checks said information from said first storage sector for coherence, reads said information stored in said second storage sector, checks said information from said second storage sector for coherence, copies said information from said first storage sector into said second storage sector when said information in said second storage sector is incoherent, copies said information from said second storage sector into said first storage sector when said information in said first storage sector is incoherent, generates an error report in place of said release signal when said information in both said first and second storage sectors is incoherent and generates an error report in place of said release signal when said information of one of said first and second storage sectors remains incoherent after said copying.

11. The apparatus according to claim 8 wherein said first storage sector includes an account memory, said second storage sector is a transfer memory and said microprocessor generates account balance data as said transaction data.

12. A method of exchanging information with a memory on a subscriber card used by a customer to pay for articles to be vended from a vending machine comprising the steps of:

a. reading information stored in a memory of a subscriber card, the memory having first and second storage sectors;

b. generating transaction data representing a purchase of an article from a vending machine utilizing the information read from the memory;

c. storing the transaction data in the second storage sector of the memory;

d. checking the transaction data in the second storage sector for coherence;

e. generating an error report when the transaction data in the second storage sector is incoherent;

f. copying transaction data from the second storage sector into the first storage sector when the transaction data in the second storage sector is coherent;

g. checking the transaction data in the first storage sector for coherence;

h. generating an error report when the transaction data in the first storage sector is incoherent; and i. generating a release signal for vending the article from the vending machine when the transaction data in the first storage sector is coherent.

\* \* \* \* \*

UNITED STATES PATENT AND TRADEMARK OFFICE
CERTIFICATE OF CORRECTION

PATENT NO. : 5,637,859
DATED : June 10, 1997
INVENTOR(S) : Menoud, Edouard

It is certified that error appears in the above-identified patent and that said Letters Patent is hereby corrected as shown below:

Title page, item [73], Assignee: should read--Journomat AG, Zurich, Seitzerland--.

Signed and Sealed this

Thirteenth Day of January, 1998

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO.   : 5,637,859
DATED        : June 10, 1997
INVENTOR(S)  : Menoud, Edouard It is certified that error appears in the above-indentified patent and that said Letters Patent is hereby corrected as shown below:

Title page, item [73], Assignee:   should read--Journomat AG, Zurich, Switzerland--.

Signed and Sealed this

Seventh Day of July, 1998

*Attest:*

BRUCE LEHMAN

*Attesting Officer*      *Commissioner of Patents and Trademarks*